UNITED STATES PATENT OFFICE.

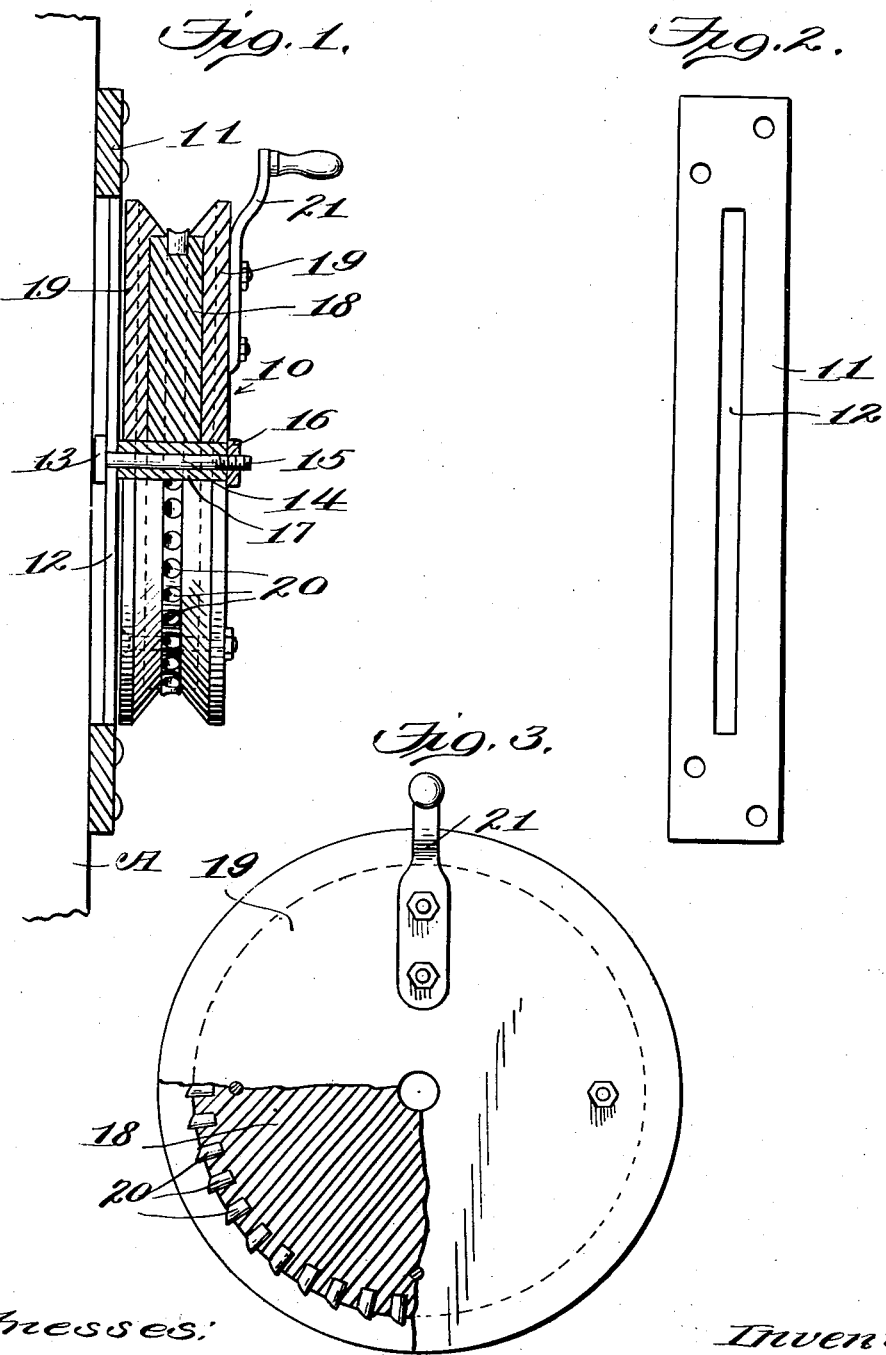

JOHN N. ANDERSON, OF MADISON, WISCONSIN, ASSIGNOR OF ONE-HALF TO CONRAD F. JORDAN, OF MADISON, WISCONSIN.

CABLE-OPERATING DRUM.

969,438.   Specification of Letters Patent.   Patented Sept. 6, 1910.

Application filed March 14, 1910. Serial No. 549,130.

*To all whom it may concern:*

Be it known that I, JOHN N. ANDERSON, a citizen of the United States, residing at Madison, in the county of Dane and State of Wisconsin, have invented certain new and useful Improvements in Cable-Operating Drums, of which the following is a specification.

My present invention relates to pulleys or drums of that character which are utilized to give movement to an endless cable or the like, the pulley or drum receiving the cable thereabout and giving such movement by its rotation.

The object of my invention is to provide a simple and inexpensive pulley which will be durable and lasting and which will have a non-slipping cable surface, and a further object is to provide means to adjustably mount the pulley.

With this in view my invention resides in the features of construction and arrangement to be hereinafter described with reference to the accompanying drawing, forming a part of this specification, and in which, Figure 1 is an edge view, partly in section, of the power pulley or drum and its mounting. Fig. 2 is a front elevation of the frame with the pulley or drum removed, and, Fig. 3 is a face view of the pulley or drum, partly in section.

Referring now to these figures, 10 represents my improved pulley or drum and 11 represents the frame to which the same is to be mounted, this frame 11 having an under cut vertical slot 12 into the under-cut of which fits the headed inner end 13 of an outstanding bolt 14, said bolt having a threaded outer end 15 and being, of course, adjustable up and down throughout the length of slot 12 when frame 11 is secured upon a suitable support A. The bolt 14 may be secured by means of a nut 16 upon its threaded end 15, which nut thus engages the outer end of a sleeve 17 upon said bolt, and which sleeve in turn bears at its inner end, against the surface of frame 11, thus binding the bolt in selected adjustment.

The pulley or drum 10 is mounted upon sleeve 17, and prevented from displacement by nut 16, and comprises a wooden core 18 and a pair of flanged metal face plates 19, the flanges of which extend partially over the periphery of said core and leave a central exposed portion into which are driven a series of studs 20, the outer concave ends of which form a traction surface for the operating cable, and one which will prevent the cable from slipping.

While this pulley or drum may, of course, be driven in any suitable manner, I have shown the same as provided with a crank 21 for manual rotation.

I claim:

1. A cable pulley or drum comprising a core, face plates secured to said core, and a series of studs projecting from said core, the ends of said studs terminating inside the peripheral edge of said face plates.

2. A cable pulley or drum comprising a circular core, enlarged circular flanged face plates secured upon the sides of said core and having their flanges extending partially over the periphery thereof, and a circular series of studs projecting from said core between said flanges and having concave cable-engaging ends.

In testimony whereof I affix my signature in presence of two witnesses.

JOHN N. ANDERSON.

Witnesses:
  MATH FIGY,
  A. H. BECKMAN.